(12) United States Patent
Ye

(10) Patent No.: US 7,908,394 B2
(45) Date of Patent: Mar. 15, 2011

(54) APPARATUS AND METHOD FOR TRANSMITTING OUTGOING DATA USING DATA DESCRIPTORS

(75) Inventor: Huanchun Ye, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 839 days.

(21) Appl. No.: 11/692,904

(22) Filed: Mar. 28, 2007

(65) Prior Publication Data
US 2007/0233994 A1  Oct. 4, 2007

Related U.S. Application Data

(60) Provisional application No. 60/787,273, filed on Mar. 30, 2006.

(51) Int. Cl.
*G06F 15/16* (2006.01)
(52) U.S. Cl. ......... 709/234; 709/212; 709/219; 709/236
(58) Field of Classification Search .................. None
See application file for complete search history.

(56) References Cited

U.S. PATENT DOCUMENTS

| | | | |
|---|---|---|---|
| 4,872,157 A | 10/1989 | Hemmady et al. | |
| 6,327,615 B1 * | 12/2001 | Kasper | 709/213 |
| 6,356,962 B1 * | 3/2002 | Kasper | 710/29 |
| 6,658,619 B1 | 12/2003 | Chen | |
| 6,889,266 B1 * | 5/2005 | Stadler | 710/22 |
| 7,020,822 B2 * | 3/2006 | Ho et al. | 714/748 |
| 7,640,382 B2 * | 12/2009 | Blackwell et al. | 710/74 |
| 7,673,072 B2 * | 3/2010 | Boucher et al. | 709/245 |
| 2006/0133424 A1 | 6/2006 | Han et al. | |

* cited by examiner

*Primary Examiner* — Jeffrey R Swearingen
(74) *Attorney, Agent, or Firm* — Thomas A. Ham; Wilson & Ham

(57) ABSTRACT

An apparatus and method for transmitting outgoing data uses data descriptors for multiple sets of contiguous data blocks stored in buffers. When new sets of contiguous data blocks are created due to acknowledgement signals for particular data blocks of the multiple sets of contiguous data blocks, new data descriptors are generated for some of the new sets of contiguous data blocks. These new data descriptors are placed in spaces in the buffers where the particular data blocks were originally stored.

16 Claims, 5 Drawing Sheets

APPARATUS AND METHOD FOR TRANSMITTING OUTGOING DATA USING DATA DESCRIPTORS

CROSS REFERENCE TO RELATED APPLICATION

This application is entitled to the benefit of U.S. Provisional Patent Application Ser. No. 60/787,273 filed on Mar. 30, 2006, which is incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, multiple subscribers can simultaneously use different subcarriers for signal transmission. Thus, in an OFDMA system, multiple data bursts can be transmitted from a base station to multiple mobile stations in the same time frame but allocated in different frequency subcarriers. Consequently, an OFDMA system can support multiple mobile stations using different subcarriers.

In the media access control (MAC) layer of an OFDMA system, outgoing data from an application is processed according to an appropriate MAC protocol to package the outgoing data for transmission. The outgoing data from the application is typically stored in linked buffers of a random access memory (RAM) as data blocks in the form of service data units (SDUs). In some implementations, the outgoing data blocks are processed according to the MAC protocol and a copy of the processed data blocks is stored in the RAM for transmission. A concern with these implementations is that the RAM must be sufficiently large to store the copy of the processed data blocks, which increases the required size of the RAM. In addition, the process of copying the processed data blocks in the RAM and reading out the process data blocks reduces speed and power efficiency.

Thus, in some implementations, descriptors of the outgoing data blocks in the buffers of the RAM are used to eliminate the need for a copy of the processed data blocks. Each of these descriptors is typically used to identify one set of contiguous data blocks in a single buffer of the RAM. However, additional descriptors may be needed when the original sets of contiguous data blocks are divided into smaller sets of contiguous data blocks due to data blocks in the original sets of contiguous data blocks that have been acknowledged and freed. These additional descriptors again increase the required size of the RAM.

Thus, there is a need for an apparatus and method for transmitting outgoing data in a communication system, such as OFDM-based wireless communication system, that reduces the required size of memory used to implement an appropriate MAC protocol.

SUMMARY OF THE INVENTION

An apparatus and method for transmitting outgoing data uses data descriptors for multiple sets of contiguous data blocks stored in buffers. When new sets of contiguous data blocks are created due to acknowledgement signals for particular data blocks of the multiple sets of contiguous data blocks, new data descriptors are generated for some of the new sets of contiguous data blocks. These new data descriptors are placed in spaces in the buffers where the particular data blocks were originally stored. Thus, the required size of the buffers is minimized.

A method for transmitting outgoing data in accordance with an embodiment of the invention comprises storing the outgoing data in buffers as multiple sets of contiguous data blocks, generating a data descriptor for each of the multiple sets of contiguous data blocks in the buffers, transmitting the multiple sets of contiguous data blocks from the buffers, receiving acknowledgement signals for particular data blocks in the multiple sets of contiguous data blocks, making available spaces in the buffers where the particular data blocks were originally stored in response to the acknowledgement signals such that new sets of contiguous data blocks are created in the buffers, and generating new data descriptors for the new sets of contiguous data blocks, including placing the new data descriptors in the spaces of the buffers.

An apparatus for transmitting outgoing data in accordance with an embodiment of the invention comprises a plurality of buffers to store the outgoing data in the buffers as multiple sets of contiguous data blocks such that each of the multiple sets of contiguous data blocks is stored in one of the buffers, and a media access control (MAC) controller operatively connected to the buffers. The MAC controller is configured to generate a data descriptor for each of the multiple sets of contiguous data blocks in the buffers. The MAC controller is further configured to generate new data descriptors for new sets of contiguous data blocks that are produced in response to receipt of acknowledgment signals for particular data blocks in the multiple sets of contiguous data blocks. The MAC controller is further configured to place the new data descriptors in spaces in the buffers where the particular data blocks were originally stored.

Other aspects and advantages of the present invention will become apparent from the following detailed description, taken in conjunction with the accompanying drawings, illustrated by way of example of the principles of the invention.

DETAILED DESCRIPTION

Figure 1:
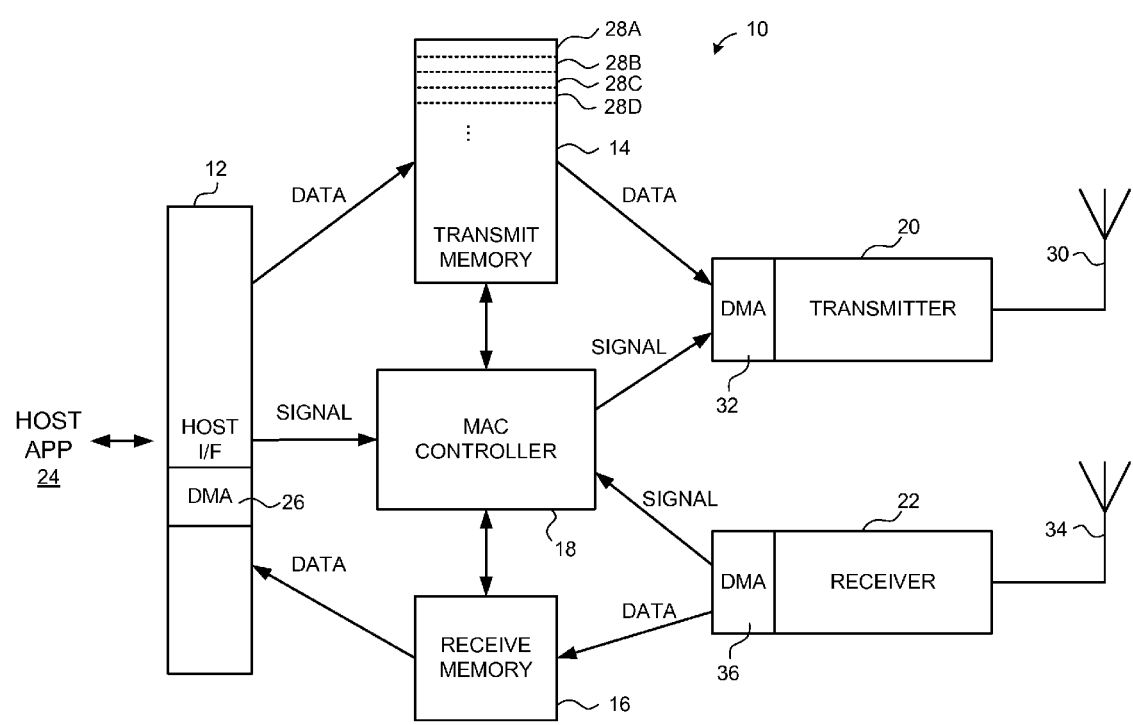
FIG. 1 is a block diagram of an apparatus for transmitting outgoing data in a communication system in accordance with an embodiment of the invention.

With reference to FIG. 1, an apparatus 10 for transmitting outgoing data in a communication system in accordance with an embodiment of the invention is described. In this embodiment, the apparatus 10 is part of an Orthogonal Frequency Division Multiple Access (OFDMA) wireless communication system based on the IEEE 802.16e standard. However, in other embodiments, the apparatus 10 may be part of other types of communication systems, which may or may not be based on prescribed standards. The apparatus 10 may be included in a base station or a mobile station of the communication system.

As shown in FIG. 1, the apparatus 10 includes a host interface 12, a transmit memory 14, a receive memory 16, a media access control (MAC) controller 18, a transmitter 20 and a receiver 22. The host interface 12 is connected to a host application 24 and is designed to function as an interface between the host application 24 and the apparatus 10. The host interface 12 is configured to receive outgoing data from the host application 24 and to transmit incoming data to the host application. The host interface 12 includes a direct memory access (DMA) controller 26, as well as other components commonly found in a typical host interface. The host interface 12 is connected to the transmit memory 14, the receive memory 16 and the MAC controller 18. The DMA controller 26 of the host interface 12 is configured to write data into the transmit memory 14 and to read data from the receive memory 16. In operation, the host interface 12 sends and receives signals to and from the MAC controller 18 to communicate data transfer information being facilitated by the host interface.

The transmit memory 14 is connected to the host interface 12, the MAC controller 18 and the transmitter 20. The transmit memory 14 is used to store outgoing data received from the host application 24 via the host interface 12. In this embodiment, the transmit memory 14 is a random access memory (RAM). However, in other embodiment, the transmit memory 14 can be a different type of computer memory. The transmit memory 14 includes a number of buffers 28A, 28B, 28C and 28D. Although, only four buffers are shown in FIG. 1, the transmit memory 14 may include many more buffers. The buffers 28A, 28B, 28C and 28D are used to temporarily store outgoing data. In some embodiments, the outgoing data stored in the buffers 28A, 28B, 28C and 28D may be processed according to a predefined MAC protocol. As described in more detail below, the buffers 28A, 28B, 28C and 28D are also used to store and data descriptors, which include information related to the outgoing data stored in the buffers. The size and number of the buffers included in the transmit memory 14 can be varied as needed. As an example, the individual size of the buffers 28A, 28B, 28C and 28D may be 128, 512 or 1024 bytes long, and the number of buffers included in the transmit memory may be 16, 32 or 64. The remaining portion of the transmit memory 14 may be used to store other data, such as hardware descriptors and interface descriptors.

The transmitter 20 operates to transmit the outgoing data stored in the buffers 28A, 28B, 28C and 28D of the transmit memory 14 as outgoing signals, for example, to a transmit antenna 30 so that the outgoing data can be wirelessly transmitted from the transmit antenna to one or more receiving devices (not shown). The transmitter 20 includes a DMA controller 32, which operates to read the outgoing data stored in the buffers 28A, 28B, 28C and 28D of the transmit memory 14 for transmission. The DMA controller 32 also processes the outgoing data to package the outgoing data in an appropriate format, as described below. The transmitter 20 also includes other components (not shown) commonly found in a transmitter. As an example, the transmitter 20 may include components commonly found in an OFDM-based transmitter, such as a channel encoder, an interleaver, a digital modulator, a subcarrier mapping unit, an inverse fast Fourier transform (IFFT) unit, a cyclic prefix prepending unit, a filtering/upsampling unit, a radio frequency (RF) modulator and amplifier unit. However, in other embodiments, the transmitter may include other components commonly found in different types of transmitters. Thus, the transmitter 20 may perform various transmission operations, such as encoding and modulation mapping, in order to transmit the outgoing data to one or more receiving devices.

The receiver 22 operates to process incoming signals received from, for example, a receive antenna 34, which in some embodiments is the same antenna as the transmit antenna 30. The receiver 22 processes the incoming signals to extract payload data in the incoming signals. The receiver 22 includes components (not shown) commonly found in a receiver. As an example, the receiver 22 includes components commonly found in an OFDM-based receiver, such as an RF demodulator, a filtering/downsampling unit, a cyclic prefix removal unit, a fast Fourier transform (FFT) unit, a subcarrier de-mapping unit, a channel estimation device, a digital demodulator, a de-interleaver and a channel decoder. However, in other embodiments, the receiver 22 may include other components commonly found in different types of receivers. Thus, the receiver 22 may perform various receiving operations, such as decoding and modulation de-mapping, in order to extract the payload data in the received incoming signals. The receiver 22 also includes a DMA controller 36.

The receiver 22 is connected to the receive memory 16 and the MAC controller 18. The DMA controller 36 of the receiver 22 operates to write the extracted data into the receive memory 16 so that the extracted data can be transmitted to the host application 24 via the host interface 12. In some embodiments, the DMA controller 36 also operates to transmit signals to the MAC controller 18 in response to specific data extracted from the incoming signals, such as acknowledgement signals that indicate certain pieces of the transmitted data were received, for example, Automatic Repeat-Request (ARQ) acknowledgement signals. As described in detail below, the MAC controller 18 generates new data descriptors for the outgoing data stored in the buffers 28A, 28B, 28C and 28D of the transmit memory 14 in response to the acknowledgement signals when contiguous data stored in the transmit memory becomes non-contiguous due to positively acknowledged pieces of data.

The receive memory 16 is connected to the MAC controller 18 and the host interface 12. The receive memory 16 is used to temporarily store the payload data extracted from the incoming signals. The stored data in the receive memory 16 is read by the DMA controller 26 of the host interface 12 and transmitted to the host application 24. In this embodiment, the receive memory 16 is a RAM. However, in other embodiment, the receive memory 16 can be a different type of memory. In the illustrated embodiment, the receive memory 16 is shown as being a separate device from the transmit memory 14. However, in other embodiments, the transmit and receive memories 14 and 16 can be a single memory device.

The MAC controller 18 operates to perform various conventional functions related to a prescribed MAC protocol on outgoing data, such as Convergence Sublayer (CS) processing and Common Part Sublayer (CPS) processing. In addition, the MAC controller 18 operates to generate buffer descriptors and data descriptors for outgoing data stored in the transmit memory 14, as described below. The MAC controller 18 also operates to modify or delete existing data descriptors and to generate new data descriptors when contiguous data stored in the buffers 28A, 28B, 28C and 28D of the transmit memory 14 becomes non-contiguous due to acknowledged pieces of data. In addition, the MAC controller 18 manages the data descriptors in the buffers 28A, 28B, 28C and 28D of the transmit memory 14 to efficiently utilize the memory space of the transmit memory 14. The MAC controller 18 can be implemented in any combination of software, firmware and/or hardware. In some embodiments, the MAC controller 18 is implemented as a processor, such as a digital signal processor or any other type of processor or controller. In some embodiments, the MAC controller 18 may be implemented in separate devices or software modules, wherein each device or module performs a function described herein with respect to the MAC controller.

Figure 2:
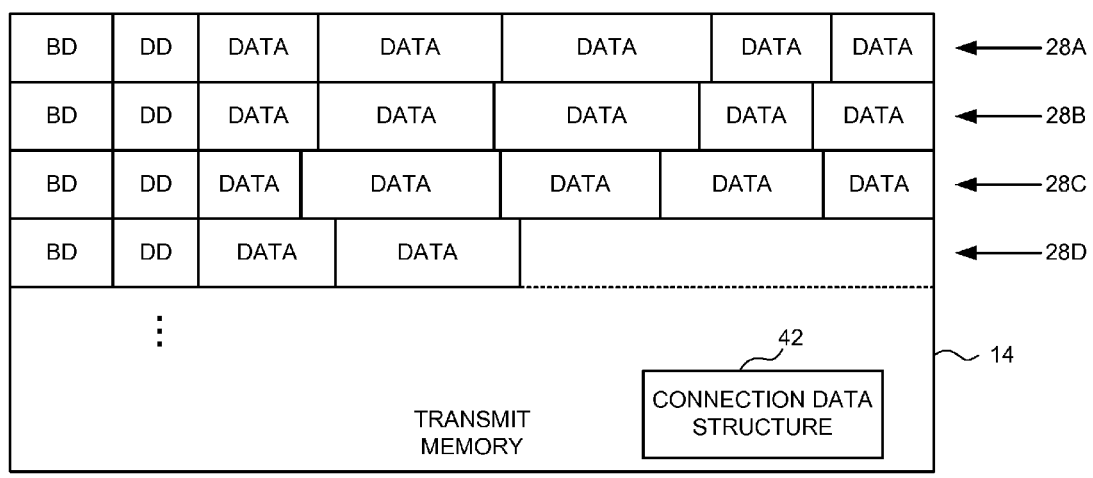
FIG. 2 is a block diagram of buffers of the apparatus of FIG. 1 in accordance with an embodiment of the invention.

Turning now to FIG. 2, the buffers 28A, 28B, 28C and 28D of the transmit memory 14 are shown in more detail to illustrate the descriptors that are generated by the MAC controller 18 in accordance with an embodiment of the invention. As an example, in FIG. 2, an outgoing application data in the form of data blocks (DATA) has been written into the buffers 28A, 28B, 28C and 28D by the DMA controller 26 of the host interface 12. Thus, these data blocks are temporarily stored in the buffers 28A, 28B, 28C and 28D. The size of the data blocks may vary depending on predefined parameters imposed on the apparatus 10. However, there is a minimum size requirement for the data blocks. As an example, the minimum size requirement for the data blocks may be 16 bytes. However, the minimum size requirement for the data block may be smaller or larger than 16 bytes. In some implementations, the data blocks may be service data units (SDUs) or ARQ blocks. In this example, the data blocks of the outgoing data occupy all the available spaces in the buffers 28A, 28B and 28C and partially occupy the buffer 28D. The data blocks in each of the occupied buffers 28A, 28B, 28C and 28D are contiguous. Thus, there are four sets of contiguous data blocks. The first, second and third sets of contiguous data blocks are stored in the buffer 28A, 28B and 28C, respectively. The fourth set of contiguous data blocks is stored in the buffer 28D, leaving some extra memory space in the buffer 28D.

As shown in FIG. 2, the MAC controller 18 has generated buffer descriptors (BD) and data descriptors (DD) for the data blocks (DATA) stored in the buffers 28A, 28B, 28C and 28D. The MAC controller 18 has placed each of the buffer descriptors at the beginning of each of the occupied buffers 28A, 28B, 28C and 28D. The MAC controller 18 has also placed each of the data descriptors in each of the occupied buffers 28A, 28B, 28C and 28D next to the buffer descriptors. However, in other embodiments, the buffer and data descriptors may be placed in any known place in the buffers 28A, 28B, 28C and 28D.

Figure 3A:
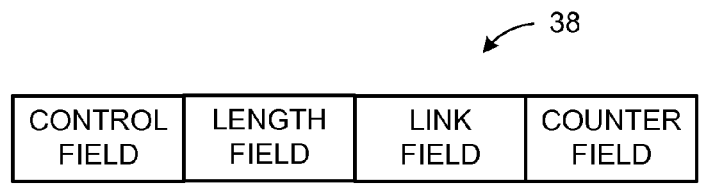
FIG. 3A is a block diagram of a buffer descriptor in accordance with an embodiment of the invention.

In FIG. 3A, a buffer descriptor 38 in accordance with an embodiment of the invention is shown. The buffer descriptor 38 is an example of the buffer descriptors generated by the MAC controller 18 and used in the apparatus 10. The buffer descriptor 38 includes a control field, a length field, a link field, and a counter field. The control field includes a control number, which indicates whether the buffer descriptor 38 is the first buffer descriptor of connected buffer descriptors, one of the middle descriptors of the connected buffer descriptors, the last descriptor of the connected buffer descriptor or the only buffer descriptor (i.e., a single buffer descriptor). The length field includes information regarding the length of the buffer in which the buffer descriptor 38 is located, i.e., the associated buffer. The link field includes information regarding the buffer descriptor of the next linked buffer. As an example, the link field includes a pointer to the buffer descriptor of the next linked buffer. The counter field includes a counter value, which is a value representing the number of data descriptors currently in the associated buffer. As described in more detail below, the counter field starts with the counter value of one and then increases and decreases as more data descriptors are added to and/or deleted from the associated buffer. The counter value in the buffer descriptor 38 allows the MAC controller 18 to know when all the data blocks in the associated buffer have been acknowledged and the associated buffer is available for use.

Figure 3B:
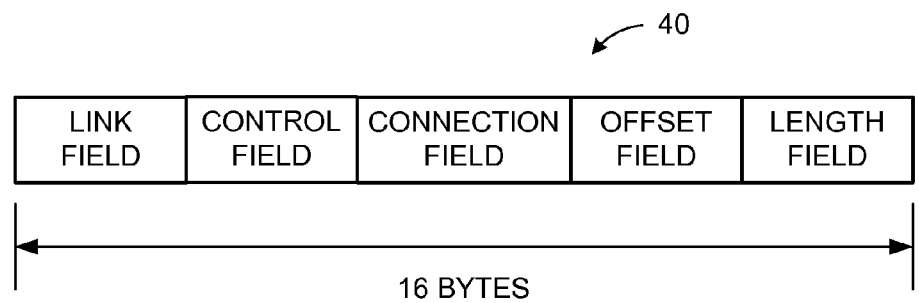
FIG. 3B is a block diagram of a data descriptor in accordance with an embodiment of the invention.

In FIG. 3B, a data descriptor 40 for a set of contiguous data blocks in accordance with an embodiment of the invention is shown. The data descriptor 40 is an example of the data descriptors generated by the MAC controller 18 and used in the apparatus 10. The data descriptor 40 includes a link field, a control field, a connection field, an offset field and a length field. The link field includes a pointer to the next data descriptor that is linked to the data descriptor 40. The link field is used to find other sets of contiguous data blocks that are not contiguous with respect to the contiguous data blocks governed by this data descriptor 40. The link field is also used to keep track of the case when a data block is split between multiple buffers. The control field includes a fragmentation control and block sequence number, which applies to the first data block governed by the data descriptor. The number in the control field indicates whether the data descriptor is the first data descriptor of connected data descriptors, one of the middle descriptors of the connected data descriptors, the last descriptor of the connected data descriptor or the only data descriptor (i.e., a single data descriptor). The connecting field includes a pointer to a connection data structure 42 (shown in FIG. 2), which contains information for the transport connection to which the contiguous data blocks governed by this data descriptor 40 belong. As an example, the information contained in the connection data structure 42 may include connection identification (CID) and ARQ window size and location, or the address of where such information is stored. Although the connecting data structure 42 is shown to be located in the transmit memory 14 in FIG. 2, the connecting data structure may be located in a different memory of the apparatus 10. The offset field includes a pointer or offset indicating the starting address of the first data block governed by the data descriptor 40. The length field includes a value that represents a length in bytes. This length value can be used to calculate the number of contiguous data blocks governed by the data descriptor.

Using the buffer descriptors and the data descriptors, the DMA controller 32 of the transmitter 20 is able to construct or package the data blocks in the buffers 28A, 28B, 28C and 28D of the transmit memory 14 as data units for transmission. These data units may include, for example, general MAC headers, subheaders, packing subheaders, fragmentation subheaders, and Cyclic Redundancy Checks (CRCs). The format of the data units can vary depending on the transmission scheme being employed. As an example, in some implementations, these data units are protocol data units (PDUs). These data units are processed and transmitted to one or more receiving devices.

Each of the buffers 28A, 28B, 28C and 28D of the transmit memory 14 will stay in use until all the data blocks in that buffer have been positively acknowledged as received, as indicated by one or more acknowledgement signals in received incoming signals. When a data block in one of the buffers 28A, 28B, 28C and 28D is positively acknowledged, the buffer space occupied by that data block is freed or is made available. Thus, when one or more data blocks in the buffers 28A, 28B, 28C and 28D are positively acknowledged, the contiguous data blocks in the buffers may become non-contiguous and may become divided into multiple sets of contiguous data blocks. Consequently, the existing data descriptors may need to be modified and new data descriptors may need to be generated for new sets of contiguous data blocks.

Figure 4A:
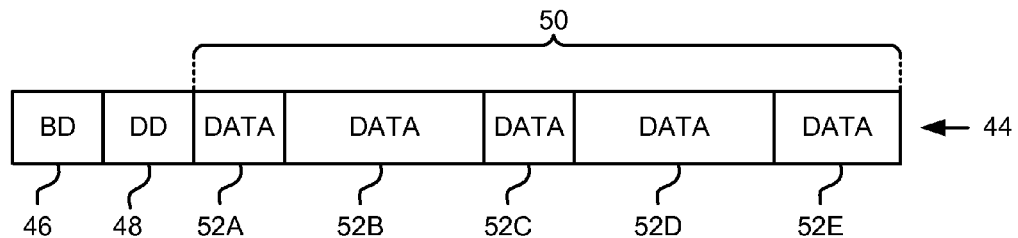
FIGS. 4A-4C illustrates a process of generating and placing new data descriptors in the buffers as data blocks are positively acknowledged in accordance with an embodiment of the invention.
Figure 4B:
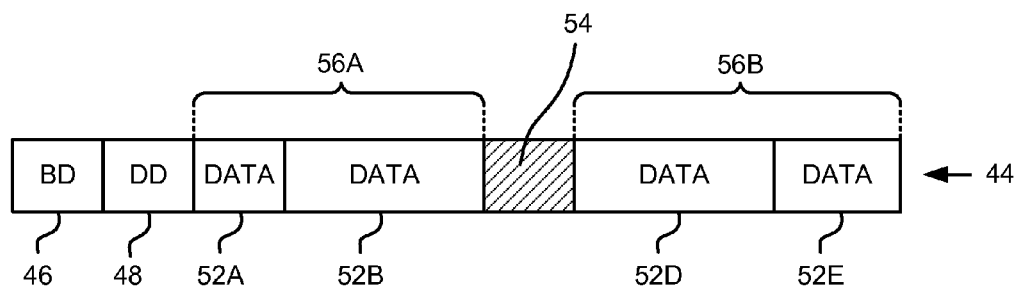
Figure 4C:
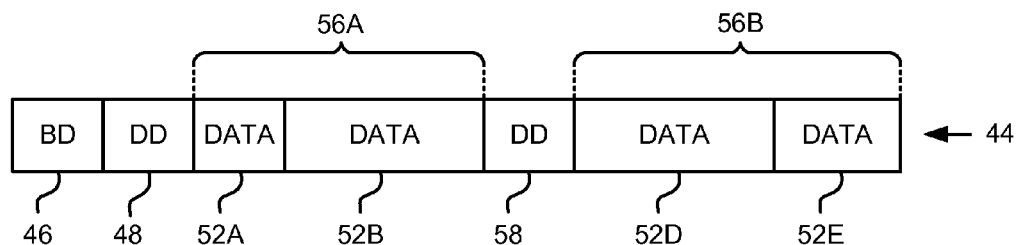

This process of modifying and generating new data descriptors as data blocks in the buffers 28A, 28B, 28C and 28D are positively acknowledged is described in more detail with reference to FIGS. 4A, 4B and 4C. In FIG. 4A, a buffer 44 with a buffer descriptor 46, a data descriptor 48, an original set 50 of contiguous data blocks 52A-52E is shown, as an example. The buffer 44 can be any of the buffers 28A, 28B, 28C and 28D of the transmit memory 14. In FIG. 4B, an acknowledgement signal for the data block 52C is received and the original space 54 in the buffer 44 occupied by the data block 52C is made available. As a result, the original set 50 of contiguous data blocks has now become non-contiguous. In particular, the original set 50 of contiguous data blocks is divided into two sets 56A and 56B of contiguous data blocks. The first set 56A of contiguous data blocks is a shorter version of the original set 50 of contiguous data blocks. In response, the MAC controller 18 modifies the existing data descriptor 48 for this first set 56A of contiguous data blocks. The second set 56B of contiguous data blocks is a new set of contiguous data blocks, which is a portion of the original set 50 of contiguous data blocks. In response, the MAC controller 18 generates a new data descriptor 58 for this second set 56B of contiguous data blocks. However, instead of placing the new data descriptors 58 in another part of the transmit memory 14, the MAC controller 18 places the new data descriptor 58 in the original buffer space 54 of the acknowledged data block 52C, which was made available due to the acknowledgment of the data block 52C. Thus, the size of the new data descriptor 58 should be at most the minimum size of a single data block so that the new data descriptor can fit in the original space of the acknowledged data block. In an embodiment, the minimum size of a single data block is 16 bytes and the size of data descriptors is 16 bytes, as illustrated in FIG. 3B. Since the buffer spaces of the acknowledged data blocks are used for new data descriptors, no additional memory space is needed for the new data descriptors. Thus, the required size of the transmit memory 14 is minimized, which can translate into an increase in power efficiency.

In an embodiment, the MAC controller 18 is able to keep track of the number of data blocks in each of the buffers 28A, 28B, 28C and 28D so that the buffers can be made available when all the data blocks in the respective buffers have been positively acknowledged. The MAC controller 18 uses the counter value in the counter field of each of the buffer descriptors to keep track of the number of data descriptors in the buffers 28A, 28B, 28C and 28D. In this embodiment, the buffers 28A, 28B, 28C and 28D are elements of an array allocated in the transmit memory 14, which is defined herein as a contiguous space in memory divided into equally sized elements. Thus, each of the buffers 28A, 28B, 28C and 28D is of the same known size. The buffers 28A, 28A, 28C, and 28D may not necessarily occupy contiguous memory spaces, but their starting addresses relative to the starting address of the array are constrained to be integral multiple of the same known size. Consequently, the MAC controller 18 is able to determine which buffer descriptor needs to be accessed for a particular data descriptor in order to change the counter value in the counter field of that buffer descriptor. This is achieved by calculating the address of the buffer in which the particular data descriptor is located. In an embodiment, the address of a buffer is the memory address at the beginning of a buffer, which coincides with the beginning of the buffer descriptor for that buffer. In other embodiments, the beginning of the buffer descriptor for that buffer may not coincide with but at a known offset from the beginning of the buffer. The buffer address is calculated by the MAC controller 18 using the following formula:

$$buffer\_address=(data\_descriptor\_address-base\_buffer\_address)/buffer\_size,$$

where data_descriptor_address is the memory address of a particular data descriptor and base_buffer_address is the memory address of the first buffer, which is also the starting address of the array. The memory address of a particular element is the memory address at the beginning of that particular element.

The buffer address allows the MAC controller 18 to know the buffer in which a particular data descriptor is located. Since the MAC controller 18 can calculate the buffer addresses from the data descriptors, there is no need for an extra field in each of the data descriptors to keep track of the buffer in which that data descriptor is located. Thus, the size of the data descriptors can be minimized, which may be critical if the minimum size of the data blocks is small because slightly larger data descriptors may not fit in the original memory spaces of acknowledged data blocks. Since the buffer for a particular data descriptor can be determined using the above formula, the MAC controller 18 can access the counter value in the counter field of the buffer descriptor for that buffer and keep track of the number of data descriptors in the buffer. When the counter value for a buffer reaches zero, that buffer can then be freed and made available for use, e.g., to store additional outgoing data blocks.

Figure 5:
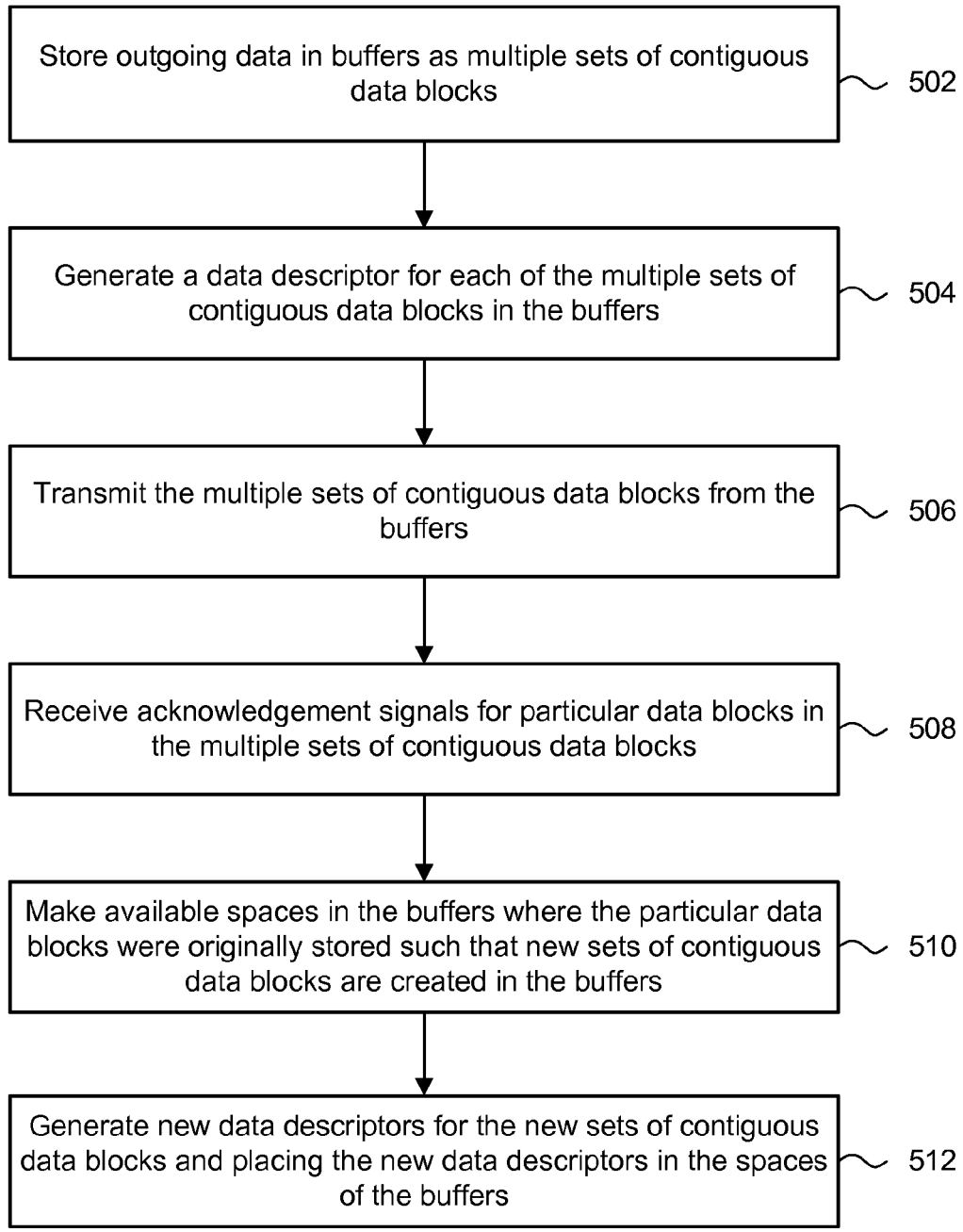
FIG. 5 is a process flow diagram of a method for transmitting outgoing data in a communication system in accordance with an embodiment of the invention.

A method for transmitting outgoing data in a communication system in accordance with an embodiment of the invention will be described with reference to a flow diagram of FIG. 5. At block 502, the outgoing data is stored in buffers as multiple sets of contiguous data blocks. Next, at block 504, a data descriptor is generated for each of the multiple sets of contiguous data blocks in the buffers. Next, at block 506, the multiple sets of contiguous data blocks are transmitted from the buffers. Next, at block 508, acknowledgement signals are received for particular data blocks in the multiple sets of contiguous data blocks. Next, at block 510, spaces in the buffers where the particular data blocks were originally stored are made available in response to the acknowledgement signals such that new sets of contiguous data blocks are created in the buffers. Next, at block 512, new data descriptors are generated for the new sets of contiguous data blocks, including placing the new data descriptors in the spaces of the buffers where the particular data blocks were originally stored.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for transmitting outgoing data, said method comprising:
   storing said outgoing data in buffers as multiple sets of contiguous data blocks;
   generating a data descriptor for each of said multiple sets of contiguous data blocks in said buffers;
   transmitting said multiple sets of contiguous data blocks from said buffers;
   receiving acknowledgement signals for particular data blocks in said multiple sets of contiguous data blocks;

making available spaces in said buffers where said particular data blocks were originally stored in response to said acknowledgement signals such that new sets of contiguous data blocks are created in said buffers;

generating new data descriptors for said new sets of contiguous data blocks, including placing said new data descriptors in said spaces of said buffers; and calculating a buffer address from a memory address of a particular data descriptor in said buffers, said buffer address corresponding to a particular buffer of said buffers in which said particular data descriptor is located, said calculating includes calculating said buffer address using:

buffer_address=(data_descriptor_address-base_buffer_address)/buffer_size, where said buffer_address is a memory address of said buffer, said data_descriptor_address is a memory address of said particular data descriptor, said base_buffer_address is a memory address of the first buffer of said buffers and said buffer_size is the size of said buffers.

2. The method of claim 1 wherein said data descriptor includes at least one of a link field, a control field, a connection field, an offset field and a length field.

3. The method of claim 2 wherein said data descriptor is sixteen bytes long.

4. The method of claim 1 further comprising generating a buffer descriptor for each of said buffers.

5. The method of claim 4 wherein said buffer descriptor includes at least one of a control field, a length field, a link field and a counter field.

6. The method of claim 1 wherein said buffers occupy contiguous memory space and wherein each of said buffers is of the same size.

7. The method of claim 1 wherein said storing includes writing said data blocks into said buffers using a first direct memory access (DMA) controller, and wherein said transmitting includes reading said data block from said buffers using a second DMA controller.

8. An apparatus for transmitting outgoing data, said apparatus comprising:

a plurality of buffers to store said outgoing data in said buffers as multiple sets of contiguous data blocks such that each of said multiple sets of contiguous data blocks is stored in one of said buffers; and a media access control (MAC) controller operatively connected to said buffers, said MAC controller being configured to generate a data descriptor for each of said multiple sets of contiguous data blocks in said buffers, said MAC controller being further configured to generate new data descriptors for new sets of contiguous data blocks that are produced in response to receipt of acknowledgment signal for particular data blocks in said multiple sets of contiguous data blocks, said MAC controller being further configured to place said new data descriptors in spaces in said buffers where said particular data blocks were originally stored, wherein said MAC controller is further configured to calculate a buffer address from a memory address of a particular data descriptor in said buffers, said buffer address corresponding to a particular buffer of said buffers in which said particular data descriptor is located and wherein said MAC controller is configured to calculate said buffer address using:

buffer_address=(data_descriptor_address-base_buffer_address)/buffer_size, where said buffer_address is a memory address of said buffer, said data_descriptor_address is a memory address of said particular data descriptor, said base_buffer_address is a memory address of the first buffer of said buffers and said buffer_size is the size of said buffers.

9. The apparatus of claim 8 further comprising a direct memory access (DMA) controller operatively connected to said buffers, said DMA controller being configured to write said outgoing data into said buffers.

10. The apparatus of claim 9 further comprising a second direct memory access (DMA) controller operatively connected to said buffers, said second DMA controller being configured to read said outgoing data into said buffers.

11. The apparatus of claim 8 wherein said buffers are in a random access memory.

12. The apparatus of claim 8 wherein said data descriptor includes at least one of a link field, a control field, a connection field, an offset field and a length field.

13. The apparatus of claim 12 wherein said data descriptor is sixteen bytes long.

14. The apparatus of claim 8 wherein said MAC controller is further configured to generate a buffer descriptor for each of said buffers.

15. The apparatus of claim 14 wherein said buffer descriptor includes at least one of a control field, a length field, a link field and a counter field.

16. The apparatus of claim 15 wherein said buffers occupy contiguous memory space and wherein each of said buffers is of the same size.

* * * * *